United States Patent [19]

Jiann-Shyan et al.

[11] Patent Number: 5,243,461
[45] Date of Patent: Sep. 7, 1993

[54] BICYCLE SIGNALLING ASSEMBLY

[76] Inventors: Tsyan Jiann-Shyan; Polo Chion, both of No. 29, Her Lih Street, Taipeng Village, Taichung Hsien, Taiwan

[21] Appl. No.: 691,970

[22] Filed: Apr. 26, 1991

[51] Int. Cl.5 .......................... B62J 6/00; H05K 7/14; H05K 7/20; B60Q 1/00
[52] U.S. Cl. ........................... 359/507; 359/550; 362/72; 362/191; 362/368; 362/373; 340/432; 361/690; 361/752
[58] Field of Search ............... 350/600, 631, 97, 101; 362/72, 157, 190, 191, 226, 362, 365, 373; 359/507, 515, 527, 528, 838, 839, 871, 549, 550, 896; 361/395, 383, 384, 399; 340/432

[56] References Cited

U.S. PATENT DOCUMENTS

| | | | |
|---|---|---|---|
| 2,931,028 | 3/1960 | Propst | 340/432 |
| 4,047,150 | 9/1977 | Kelley | 362/191 |
| 4,226,491 | 10/1980 | Kazama et al. | 361/395 |
| 4,323,879 | 4/1982 | Kelley | 362/72 |
| 4,459,640 | 7/1984 | Latasiewscz et al. | 361/395 |
| 4,875,140 | 10/1989 | Delpech et al. | 361/395 |
| 4,949,228 | 8/1990 | Lin et al. | 362/72 |
| 4,974,124 | 11/1990 | Wu | 362/72 |
| 5,015,918 | 5/1991 | Copeland | 362/72 |

Primary Examiner—Bruce Y. Arnold
Assistant Examiner—R. D. Shafer
Attorney, Agent, or Firm—Bacon & Thomas

[57] ABSTRACT

A bicycle signalling assembly comprises a seat body having two cylinders constructed in such a manner that a circuit board can be fastened securely to cylinders without using a hand tool.

3 Claims, 2 Drawing Sheets

BICYCLE SIGNALLING ASSEMBLY

BACKGROUND OF THE INVENTION

The present invention relates to a bicycle signalling assembly, and more particularly to a bicycle signalling assembly designed with improved structures.

As shown in FIG. 1, a bicycle signalling assembly of the prior art comprises a seat 1 having two cylinders 4 to accommodate a circuit board 2. The circuit board 2 is fastened to cylinders 4 by means of an engagement between a screw 3 and a screw hole 5 of the cylinder 4. The assembly of a bicycle signalling device described above is tedious and requires a tool such as a screw driver. In addition, the production cost of a bicycle signalling assembly of the prior art is unjustifiably expensive.

SUMMARY OF THE INVENTION

The primary objective of the present invention is to provide a bicycle signalling assembly with an improved seat body permitting a fast assembly of the bicycle signalling device without using a hand tool.

In keeping with the principles of the present invention, the primary objective is accomplished by a seat body comprising two stepped cylinders which engage directly with the circuit board.

DESCRIPTION OF THE PREFERRED EMBODIMENT

Figure 4:
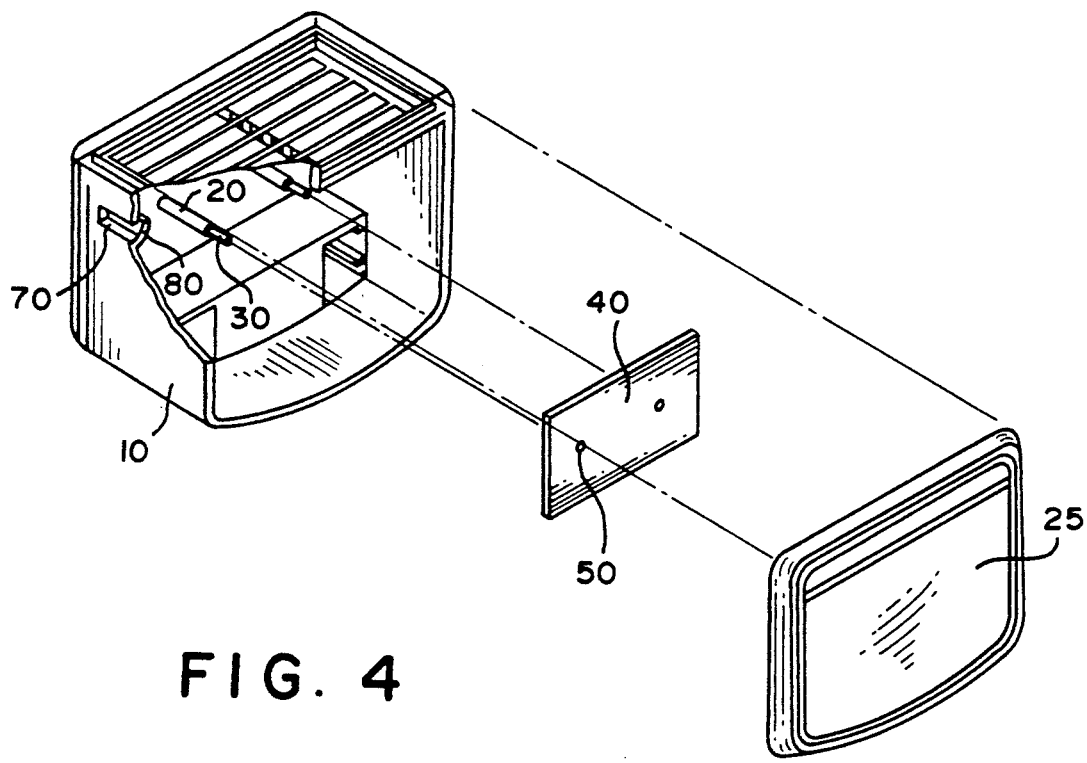
FIG. 4 shows an exploded view of the preferred embodiment of the present invention.

Referring to FIG. 4, a bicycle signalling assembly embodied in the present invention is shown comprising a seat body 10 having two cylinders 20 disposed therein and a lens 25 adapted to be secured to seat body 10 by any means known in the art. The end portion of each of two cylinders 20 is constructed as stepped portion 30, which serves to engage with the board hole 50 of the circuit board 40.

Figure 5:
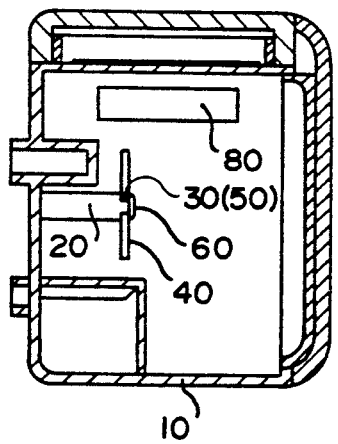
FIG. 5 shows a cut-away view of the preferred embodiment of the present invention.

As shown in FIG. 5, the end of stepped portion 30 of the cylinder 20 extends beyond the thickness of the circuit board 40 and is welded to a protruded particle 60 so as to ensure that the circuit board 40 is fastened securely to the cylinder 20.

Figure 1:
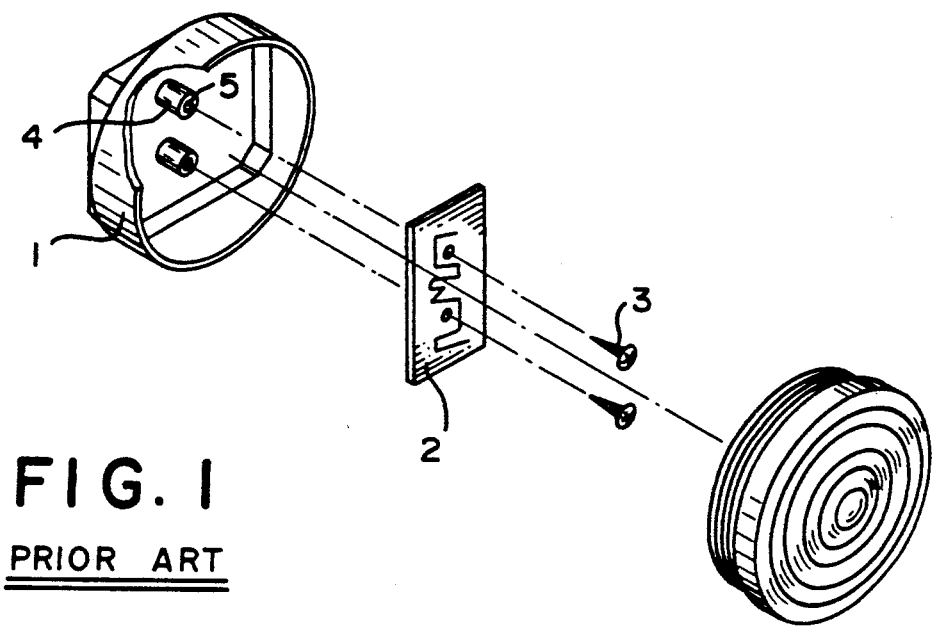
FIG. 1 shows an exploded view of a bicycle signalling assembly of the prior art.
Figure 2:
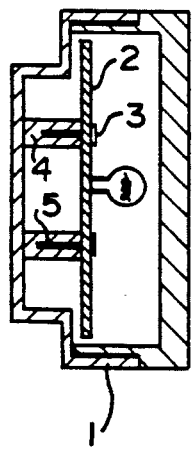
FIG. 2 shows a cut-away view of a bicycle signalling assembly of the prior art.
Figure 3:
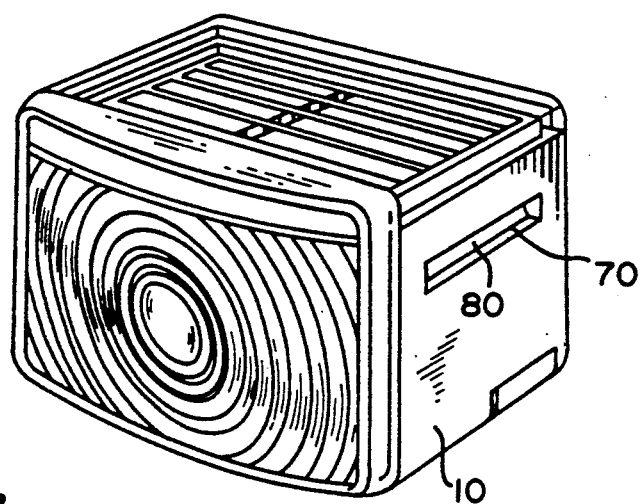
FIG. 3 shows an external and three-dimensional view of the preferred embodiment according to the present invention.

Now referring to FIG. 3, the seat body 10 is shown comprising a vent 70 disposed at lateral sides thereof. The vent 70 is set up to help circulate the warm air inside the seat body 10. In the meantime, an inclined visor 80 is attached to the vent 70 to prevent rain water from entering the seat body 10.

The embodiment of the present invention described above is to be considered in all respects as merely an illustration of principles of the present invention. Accordingly, the present invention is to be limited only by the scope of the hereinafter appended claims.

What is claimed is:

1. A bicycle signalling assembly comprising:
   a seat body defining a substantially open ended enclosure, said seat body including at least one vent to aid in circulating air within said enclosure and at least one visor which is secured to said seat body adjacent said at least one vent to prevent rain water from entering said enclosure;
   at least one mounting cylinder having a first diametric portion including a first end fixedly secured to said seat body and a second reduced diametric portion;
   a circuit board having at least one mounting hole formed therein, said at least one hole having a diameter slightly greater than the diameter of said second, reduced diametric portion for receiving said second, reduced diametric portion therethrough to attach said circuit board to said seat body within said enclosure; and
   a lens secured to said seat body to enclose said circuit board, wherein said seat body can be secured to a bicycle to provide a signalling assembly.

2. A bicycle signalling assembly as claimed in claim 1, wherein said circuit board is formed with a plurality of mounting holes and said reflector assembly is provided with a plurality of mounting cylinders each of which are received within a respective one of said mounting holes.

3. A bicycle signalling assembly as claimed in claim 1, wherein said second reduced diametric portion of said at least one mounting cylinder includes an end remote from said first diametric portion which is adapted to be welded down to form a protruded particle having a diameter greater than said at least one mounting hole so as to securely fasten said circuit board between said protruded particle and said first diametric portion.

* * * * *